(12) United States Patent
Kenmochi et al.

(10) Patent No.: US 9,000,320 B2
(45) Date of Patent: Apr. 7, 2015

(54) METHOD OF MANUFACTURING ELECTRIC RESISTANCE WELDING PIPE HAVING EXCELLENT CHARACTERIZATION OF WELDED SEAM

(75) Inventors: Kazuhito Kenmochi, Tokyo (JP); Takatoshi Okabe, Tokyo (JP); Hiroyasu Yokoyama, Tokyo (JP); Yuji Sugimoto, Tokyo (JP); Muneyoshi Murakami, Tokyo (JP); Osamu Shiotani, Tokyo (JP); Nobuyuki Matsuo, Tokyo (JP); Tomohiro Inoue, Tokyo (JP); Kenichi Iwazaki, Tokyo (JP)

(73) Assignee: JFE Steel Corporation (JP)

( * ) Notice: Subject to any disclaimer, the term of this patent is extended or adjusted under 35 U.S.C. 154(b) by 1242 days.

(21) Appl. No.: 11/992,918

(22) PCT Filed: Nov. 9, 2006

(86) PCT No.: PCT/JP2006/322790
§ 371 (c)(1),
(2), (4) Date: Apr. 29, 2008

(87) PCT Pub. No.: WO2007/069425
PCT Pub. Date: Jun. 21, 2007

(65) Prior Publication Data
US 2009/0223935 A1    Sep. 10, 2009

(30) Foreign Application Priority Data

Dec. 16, 2005   (JP) .................................. 2005-362722
Jun. 13, 2006   (JP) .................................. 2006-163203
Jul. 6, 2006    (JP) .................................. 2006-186675
Jul. 7, 2006    (JP) .................................. 2006-188569

(51) Int. Cl.
*B23K 13/00*   (2006.01)
*B21C 37/08*   (2006.01)
(Continued)

(52) U.S. Cl.
CPC .......... *B21C 37/0822* (2013.01); *B21C 37/0826* (2013.01); *B21C 37/083* (2013.01); *B23K 11/062* (2013.01); *B23K 33/006* (2013.01); *B23K 2201/06* (2013.01)

(58) Field of Classification Search
CPC ....... B23K 13/00; B21C 37/08; B21C 37/083
USPC ........ 219/29.1, 60 R, 60.2, 61.11, 61.2, 61.5, 219/61; 228/144, 146, 147; 413/58; 138/156; 72/368, 370.4, 370.24; 29/700, 525.14
See application file for complete search history.

(56) References Cited

U.S. PATENT DOCUMENTS 1,698,584 A     1/1929   Fell
4,568,015 A *   2/1986   Toyooka et al. ............... 228/147
(Continued)

FOREIGN PATENT DOCUMENTS

JP   57-31485 A    2/1982
JP   63-317212 A   12/1988
(Continued)

*Primary Examiner* — Brian Jennison
(74) *Attorney, Agent, or Firm* — DLA Piper LLP (US)

(57) ABSTRACT

A method of manufacturing an electric resistance welding pipe is provided in which a lateral edge shape is made to be an appropriate shape immediately before electric resistance welding is performed, whereby penetrators are securely removed during the electric resistance welding and, consequently, an electric resistance welding pipe having excellent characterization of welded seam can be obtained. A fin shape in finpass forming is printed to lateral edges of a strip, whereby the lateral edges of the strip are shaped with predetermined tapering.

7 Claims, 8 Drawing Sheets

(51) Int. Cl.
  *B21C 37/083* (2006.01)
  *B23K 11/06* (2006.01)
  *B23K 33/00* (2006.01)

(56) References Cited

U.S. PATENT DOCUMENTS

| | | | |
|---|---|---|---|
| 4,771,931 A * | 9/1988 | Matsui et al. | 228/147 |
| 5,494,209 A | 2/1996 | Randlett et al. | |
| 5,730,189 A * | 3/1998 | Randlett et al. | 138/171 |
| 2006/0191874 A1* | 8/2006 | Holdren | 219/61 |

FOREIGN PATENT DOCUMENTS

| | | |
|---|---|---|
| JP | 2-307686 A | 12/1990 |
| JP | 4-105709 A | 4/1992 |
| JP | 6-180220 A | 6/1994 |
| JP | 7-16760 A | 1/1995 |
| JP | 10-109109 A | 4/1998 |
| JP | 10-505283 | 5/1998 |
| JP | 11-342493 A | 12/1999 |
| JP | 2001-170779 A | 6/2001 |
| JP | 2001-259733 A | 9/2001 |
| JP | 2003-164909 A | 6/2003 |

* cited by examiner

FIG.4A    FIG.4B    FIG.4C
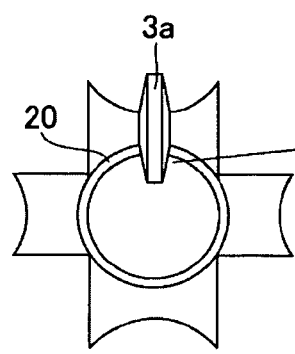 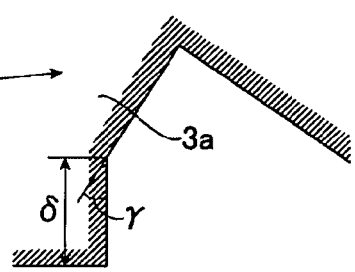 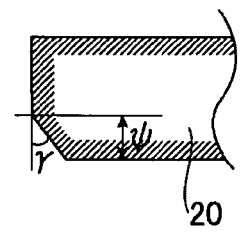
FIG.4D    FIG.4E    FIG.4F
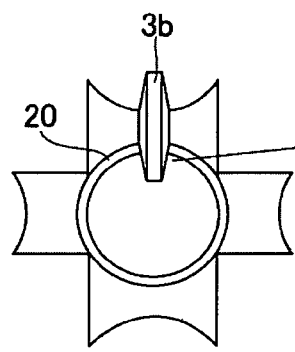 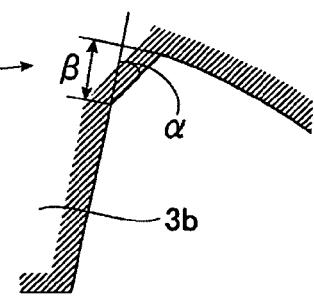 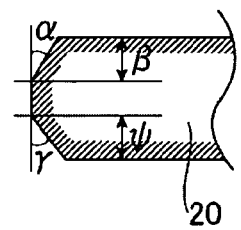

FIG.5A    FIG.5B    FIG.5C
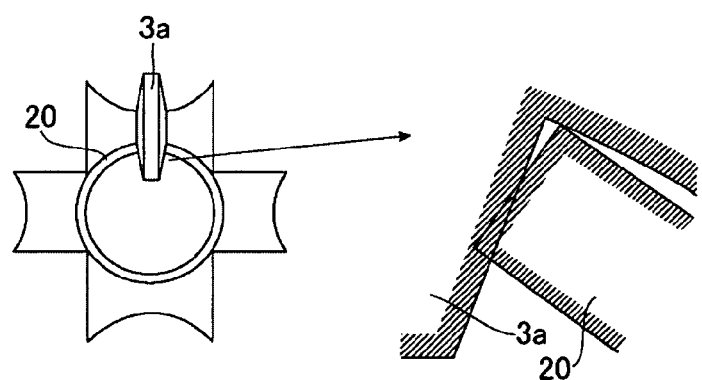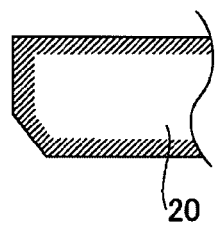
FIG.5D    FIG.5E    FIG.5F
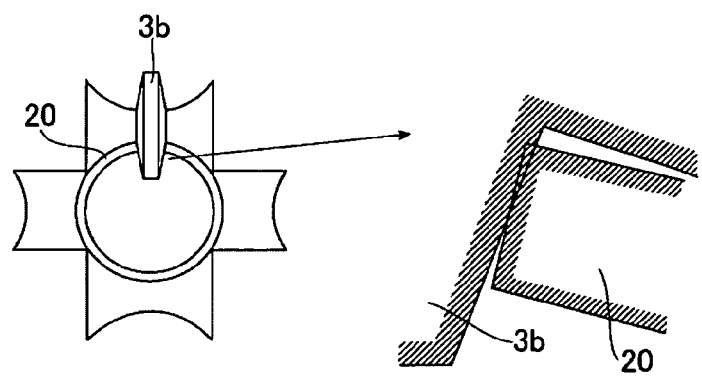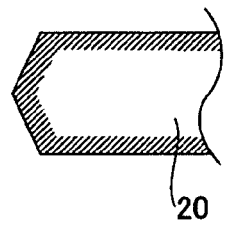

FIG.6A     FIG.6B
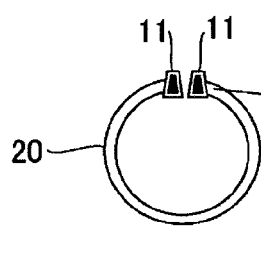 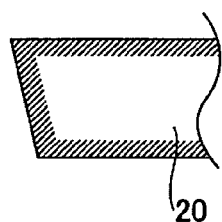
FIG.6C     FIG.6D     FIG.6E
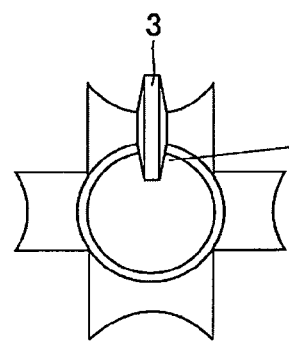 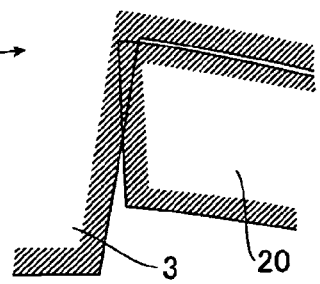 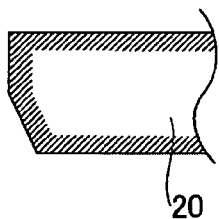

METHOD OF MANUFACTURING ELECTRIC RESISTANCE WELDING PIPE HAVING EXCELLENT CHARACTERIZATION OF WELDED SEAM

RELATED APPLICATIONS

This is a §371 of International Application No. PCT/JP2006/322790, with an international filing date of Nov. 9, 2006 (WO 2007/069425 A1, published Jun. 21, 2007), which is based on Japanese Patent Application Nos. 2005-362722, filed Dec. 16, 2005, 2006-163203, filed Jun. 13, 2006, 2006-186675, filed Jul. 6, 2006, and 2006-188569, filed Jul. 7, 2006.

TECHNICAL FIELD

This disclosure relates to a method of manufacturing a pipe required to have toughness of weld such as line pipe for oil well, or a pipe required to have strength of weld such as casing for oil well.

BACKGROUND

Generally, pipes are roughly classified into welding pipes and seamless pipes. An electric resistance welding pipe as one of the welding pipes is manufactured by curling a sheet by roll forming or the like, and then confronting each edge and welding. In the welding pipes, toughness and strength of weld are generally bad compared with those of a mother strip. In any case of using a pipe, it is a problem to insure toughness and strength of weld for each application.

For example, since a line pipe for transporting crude oil or natural gas is often laid in the cold latitudes, low temperature toughness is essentially concerned. Moreover, strength is importantly concerned with a casing for protecting a mining pipe in an oil well for mining crude oil.

Typically, a hot-rolled sheet (strip) to be a mother strip of an electric resistance welding pipe is designed in composition or subjected to heat treatment in consideration of properties of the mother strip after pipe manufacturing to secure properties of the mother strip such as toughness and strength.

However, since characterization of welded seam is largely dependent on an electric resistance welding method compared with the composition design or heat treatment of the mother strip, improvement in welding technique is important.

As a cause of defective electric resistance welding, oxides called penetrators are given, which are generated on an edge of a welding sheet material. In many cases, the penetrators are not discharged from the edge along with melting steel during electric resistance welding and remained thereon, and the remained penetrators cause reduction in toughness, leading to insufficient strength.

Thus, to remove the penetrators from weld, earnest investigation has been made so far on an active discharging technique of melting steel from lateral edges of a strip to be welded in the weld. For example, JP-A-57-031485 or JP-A-63-317212 describes an example of investigation on a shape of each lateral edge of the strip. In the example, it is intended that the lateral edge of the strip, which is typically formed in an approximately rectangular shape by slitting or edge shaving, is processed in shape before electric resistance welding is performed such that the processed shape of the lateral edge improves discharge of melting steel during welding. This is summarized as follows.

That is, a basic manufacturing line of the electric resistance welding pipe is as shown in FIG. 1. The manufacturing line of the electric resistance welding pipe has a configuration where a strip 10 is uncoiled from an uncoiler 1; then the strip is reformed to be flat by a leveler 2; then the strip 10 is gradually rounded by a roll forming machine 4; then right and left, two lateral edges of the rounded strip 10 are welded by electric resistance welding using an electric resistance welder including an induction heating section 5 and a squeeze roll (electric resistance welding section) 6 so that the strip is formed into a pipe 30; then a weld bead portion of the pipe 30 is cut by a bead cutter 7; then the pipe 30 after cutting is adjusted in outer diameter by a sizer 8; and then the pipe is cut out into a predetermined length by a pipe cutter 9. The roll forming machine 4 has a predetermined number of finpass forming stands 3 that constrain a strip edge that has been rounded in a last stage to shape it into an approximate round, the stand 3 including a first stand 3a and a second stand 3b herein.

In the technique described in JP-A-57-031485, as shown in FIG. 5A showing a cross section diagram and FIG. 5B showing a partial detail diagram thereof, in the finpass forming first-stand 3a, a part of a lateral edge of the strip 10 formed into the pipe shape is contacted to a fin of a finpass hole-shape roll so as to shape tapering on a lateral edge to be an edge at an inner surface side of the pipe as shown in FIG. 5C, and as shown in FIG. 5D showing a cross section diagram and FIG. 5E showing a partial detail diagram thereof, in the finpass forming second-stand 3b, another part of the lateral edge of the strip 10 is contacted to the fin so as to shape tapering on a lateral edge to be an edge at an outer surface side of the pipe as shown in FIG. 5F, and thus an X-groove is formed. An angle of a fin of each of the finpass forming first-stand 3a and the finpass forming second-stand 3b is a typical one angle.

In the technique described in JP-A-63-317212, as shown in FIG. 6A showing a cross section diagram, an edger roll 11 is arranged at an upstream side of a finpass forming stand, and the edger roll 11 is used to reduce a lateral edge of the strip 10 formed into the pipe shape so as to shape tapering on the lateral edge of the strip 10 as a whole as shown in FIG. 6B, and as shown in FIG. 6C showing a cross section diagram and FIG. 6D showing a partial detail diagram thereof, in a finpass forming stand 3, a part of the lateral edge of the strip 10 is contacted to a fin of a finpass hole-shape roll, thereby a lateral edge to be an edge at an outer surface side of the pipe is shaped to be a vertical surface as shown in FIG. 6E. JP-A-2001-170779, JP-A-2001-259733 and JP-A-2003-164909 describe examples of investigating a shape of a strip edge. That is, it is intended that a strip edge, which is typically formed in an approximately rectangular shape by slitting or edge shaving, is tapered before roll forming such that the processed edge shape improves discharge of melting steel during welding.

However, we investigated the method described in JP-A-57-031485 and, as a result, found that even if the amount of upset in finpass forming was greatly changed, it was significantly difficult to contact only a part of the lateral edge of the strip 10 to the fin of the finpass hole-shape roll. This is because since the lateral edge of the strip 10 was slightly work-hardened in a previous forming process, the whole lateral edge of the strip is easily deformed along the fin so as to perfectly fill the fin portion, consequently a shape of the fin is printed to the lateral edge of the strip. As a result, the lateral edge of the strip 10 is not in a desired shape immediately before electric resistance welding is performed, and in an extreme case, the lateral edge is in a flat shape having a slope at only one side.

Moreover, we investigated the method described in JP-A-63-317212 and, as a result, confirmed the following. That is, to shape tapering to the whole lateral edge of the strip 10 using the edger roll 11 during roll forming (at the upstream side of the finpass forming stand), since the edger roll, of which the diameter is gradually increased from a pipe outer-surface side to a pipe inner-surface side, needs to be used for forming as described in JP-A-63-317212, a lateral edge to be an edge at the pipe inner-surface side is shaved by the edger roll, which may problematically induce pads called "whisker." Furthermore, since large reaction force that opens the pipe-shaped strip 10 outward is exerted in a cross section direction of the strip 10 to be subjected to roll forming, pressure between the edger roll 11 and the lateral edge of the strip 10 is necessarily reduced. As a result, as in JP-A-57-031485, the strip is hardly work-hardened through reduction of the lateral edge by the edger roll, and even if the amount of upset is reduced in subsequent finpass forming, the strip substantially fills the fin portion, therefore it is difficult that the lateral edge of the strip 10 is shaped as described in JP-A-63-317212, consequently the tapering is completely eliminated, and the edge becomes flat.

It would therefore be advantageous to provide a method of manufacturing an electric resistance welding pipe, in which a lateral edge shape can be made into an appropriate shape immediately before electric resistance welding is performed, thereby melting steel is sufficiently discharged during electric resistance welding so that penetrators are securely removed, consequently an electric resistance welding pipe having excellent characterization of welded seam can be obtained.

As described before, in JP-A-57-031485 or JP-A-63-317212, a part of the lateral edge of the strip is pressed against the fin of the finpass hole-shape roll to shape the tapering to the lateral edge of the strip. However, according to the investigation, we understood that, even if the finpass hole-shape roll was not wholly filled with the strip in a circumferential direction, when the strip was loaded into the finpass hole-shape roll, the lateral edge was highly pressurized by the fin, so that the fin portion was perfectly filled with the lateral edge. That is, we understood that, when the strip was loaded into the finpass hole-shape roll, a lateral edge portion of the strip being contacted to the fin and a laterally central portion of the strip (portion of a bottom of the pipe-shaped strip) situated approximately 180 degrees opposite to the lateral edge portion were in a beam deflection condition, so that reaction force of the strip that acted to bend the cross section of the pipe-shaped strip into an arcuate shape was greatly exerted, consequently even if the strip did not fill the finpass hole-shape roll, large compression force was exerted on the lateral edge of the strip in the circumferential direction, as a result, the lateral edge of the strip was highly-pressurized by the fin, and consequently a shape of the fin was directly printed to the lateral edge of the strip.

Thus, we noticed a phenomenon that the lateral edge of the strip was highly-pressurized by the fin in the finpass forming, and conceived a method of shaping the predetermined tapering on the lateral edge of the strip by actively using the phenomenon. That is, we found that when the fin was shaped with two or more stages of tapering, even if the amount of upset in finpass forming was small, the lateral edge of the strip was able to be shaped with desired tapering, thereby the lateral edge of the strip was able to be shaped with appropriate tapering immediately before electric resistance welding was performed.

Moreover, JP-A-2003-164909 discloses various chamfer shapes that facilitate adjustment of confronting pressure. However, it does not make any description on a point of discharging penetrators along with melting steel, and a point of improving characterization of welded seam (particularly low temperature toughness) by such penetrator discharging. Therefore, it is completely unclear that which shape may improve the characterization of welded seam (particularly low temperature toughness) among the various chamfer shapes disclosed therein.

SUMMARY

We provide:
1. A method of manufacturing an electric resistance welding pipe having excellent characterization of welded seam, characterized in that in a process where a strip is subjected to forming, and edges are shaped to substantially face each other, and welded by electric resistance welding to form a pipe, edges at either of top and bottom sides of the strip, or edges at both of the top and bottom sides of the strip are shaped with tapering before the electric resistance welding is performed.
2. A method of manufacturing an electric resistance welding pipe having excellent characterization of welded seam, characterized in that in finpass forming of a roll forming process, a fin shape having two or more angles is used to print the shape to edges of a strip to shape tapering on the edges.
3. The method of manufacturing the electric resistance welding pipe having excellent characterization of welded seam according to the previous section 1 or 2, characterized in that edges at one side in a thickness direction of the strip are round-shaped.
4. The method of manufacturing the electric resistance welding pipe having excellent characterization of welded seam according to the previous sections 1 to 3, characterized in that edges at an inner diameter side of the strip are shaped with tapering in a former stage of finpass forming, and edges at an outer diameter side of the strip are shaped with tapering in a latter stage of the finpass forming.
5. The method of manufacturing the electric resistance welding pipe having excellent characterization of welded seam according to the previous sections 1 to 4, characterized in that the edges are shaped with the tapering in finpass forming including at least a finpass last-stand.
6. The method of manufacturing the electric resistance welding pipe having excellent characterization of welded seam according to the previous sections 1 to 5, characterized in that in tapering of the strip after finpass forming, an angle from a surface of strip edge toward vertical direction is in a range of 25 degrees to 50 degrees, and length of a perpendicular from starting position to end position shaped the tapering at one side is 20% to 45% of thickness.
7. The method of manufacturing the electric resistance welding pipe having excellent characterization of welded seam according to the previous sections 1 to 6, characterized in that electric resistance welding is performed while non-active gas or deoxidation gas is blown.
8. The method of manufacturing the electric resistance welding pipe having excellent characterization of welded seam according to the previous sections 1 to 7, characterized in that electric resistance welding is performed with a confronting angle between edges of a sheet being from −1 degree to +1 degree.
9. The method of manufacturing the electric resistance welding pipe having excellent characterization of welded seam according to the previous sections 1 to 8, characterized in that electric resistance welding is performed with a vee angle shaped by strip edge being from 2 degrees to 8 degrees.

BRIEF DESCRIPTION OF THE DRAWINGS

FIGS. 4A to 4F are diagrams for illustrating a third aspect of our methods;

FIGS. 5A to 5F are diagrams for illustrating prior art described in JP-A-57-031485;

FIGS. 6A to 6E are diagrams for illustrating prior art described in JP-A-63-317212;

Figure 1:
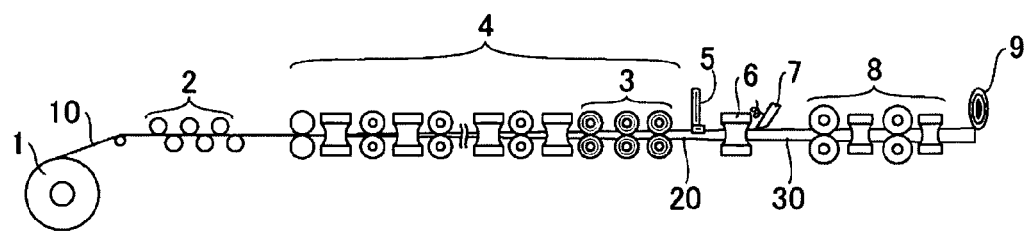
FIG. 1 is an explanatory diagram of a manufacturing line of an electric resistance welding pipe.

Numbers in figures refer to the following respectively:

1 uncoiler
2 leveler
3 finpass forming stand
3a finpass forming first-stand
3b finpass forming second-stand
4 roll forming machine
5 induction heating apparatus
6 squeeze roll (electric resistance welding section)
7 bead cutting bite
8 sizer
9 pipe cutter
10 strip
20 sheet formed in pipe shape
30 pipe
40 advance direction of strip 10 (formed into pipe 30 after welding)
50 contact tip
60 gas supply nozzle

DETAILED DESCRIPTION

Preferred aspects of our methods will be described according to drawings.

A manufacturing line of an electric resistance welding pipe is as shown in the FIG. 1. That is, the manufacturing line of an electric resistance welding pipe has a configuration where a strip 10 is uncoiled from an uncoiler 1; then the strip is reformed to be flat by a leveler 2; then the strip 10 is gradually rounded by a roll forming machine 4; then right and left, two lateral edges of the rounded strip 10 are welded by electric resistance welding using an electric resistance welder including an induction heating section 5 and a squeeze roll (electric resistance welding section) 6 so that the strip is formed into a pipe 30; then a weld bead portion of the pipe 30 is cut by a bead cutter 7; then the pipe 30 after cutting is adjusted in outer diameter by a sizer 8; and then the pipe is cut out into a predetermined length by a pipe cutter 9. The roll forming machine 4 has a predetermined number of finpass forming stands 3 that constrain a sheet edge that has been rounded in a last stage to be into an approximate round shape, the stand 3 including a first stand 3a and a second stand 3b herein.

Figures 2A, 2B:
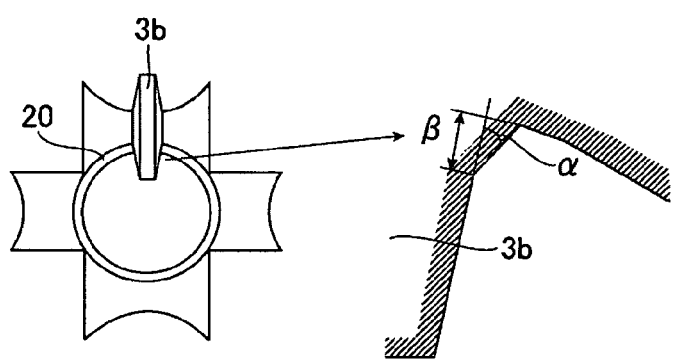
FIGS. 2A, 2B and 2C are diagrams for illustrating a first aspect of our methods.
Figure 2C:
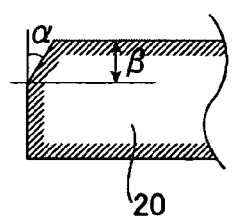

In a first example, while a fin of the finpass forming first-stand 3a has typical one-stage tapering, as shown in FIG. 2A showing a cross section diagram and FIG. 2B showing a partial detail diagram thereof, a fin of the second-stage stand 3b has two-stage tapering (second-stage tapering angle is $\alpha$, and second-stage slope vertical-length is $\beta$), and such a shape is printed to right and left, two lateral edges of the strip 10, thereby as shown in FIG. 2C, right and left, two lateral edges at a side to be an outer surface side of a pipe are shaped with the predetermined tapering (a slope angle from a lateral edge to a surface to be the outer surface of the pipe is $\alpha$, and a distance in a thickness direction between a start position on the lateral edge and the surface to be the outer surface of the pipe is $\beta$).

The tapering shaped on the right and left, two lateral edges of the strip 10 is made such that the slope angle $\alpha$ from the lateral edge of the strip 10 to the surface to be the outer surface of the pipe is 25° to 50°, and the distance $\beta$ in a thickness direction of the strip between the tapering start position on the lateral edge and the surface to be the outer surface of the pipe is 20% to 40% of strip thickness.

This is because when the slope angle $\alpha$ is less than 25°, melting steel is insufficiently discharged from the central portion in thickness of the strip, and penetrators are defectively remained, resulting in reduction in toughness or strength after electric resistance welding is finished, and when the slope angle $\alpha$ is more than 50°, the tapering is problematically remained as a flaw on a product pipe even after electric resistance welding is finished. Moreover, when the tapering start distance $\beta$ is less than 20% of thickness, melting steel is insufficiently discharged from the central portion in thickness, so that the penetrators tend to be remained, and when the tapering start distance $\beta$ is more than 40% of thickness, the tapering is problematically remained as a flaw on a product pipe even after electric resistance welding is finished.

As described above, the fin shape of the finpass forming end stand 3b is made to be the shape having two angles, and the fin shape is printed to the right and left, two lateral edges of the strip 10, therefore a shape of each lateral edge of the strip 10 can be shaped with appropriate tapering immediately before electric resistance welding is performed. As a result, the melting steel is sufficiently discharged during electric resistance welding, and the penetrators are securely removed, and consequently an electric resistance welding pipe having excellent characterization of welded seam can be obtained.

In the above, right and left, two lateral edges at a side to be an inner circumferential surface side of the pipe can be also shaped with predetermined tapering by changing a shape of the two-stage tapering.

Figure 3A:
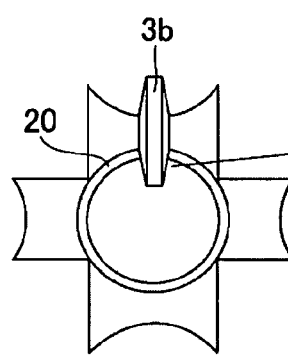
FIGS. 3A, 3B and 3C are diagrams for illustrating a second aspect of our methods.
Figure 3B:
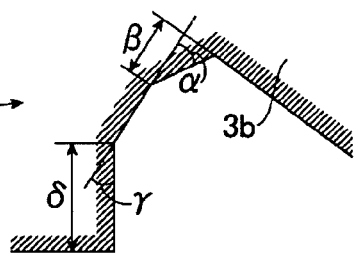
Figure 3C:
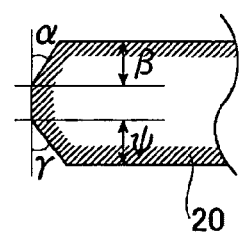

In another example, while a fin of the finpass forming first-stand 3a has typical one-stage tapering, as shown in FIG. 3A showing a cross section diagram and FIG. 3B showing a partial detail diagram thereof, a fin of the second stand 3b has three-stage tapering (first-stage slope vertical-length is $\delta$, second-stage tapering angle is $\gamma$, third-stage tapering angle is $\alpha$, and third-stage slope vertical-length is β), and such a shape is printed to right and left, two lateral edges of the strip 10, thereby as shown in FIG. 3C, right and left, two lateral edges at a side to be an outer surface side of a pipe are shaped with predetermined tapering (a slope angle from a lateral edge to a surface to be the outer surface of the pipe is α, and a distance in a thickness direction between a start position on the lateral edge and the surface to be the outer surface of the pipe is β), and right and left, two lateral edges at a side to be an inner surface side of the pipe are shaped with predetermined tapering (a slope angle from a lateral edge to a surface to be the inner surface of the pipe is γ, and a distance in a thickness direction between a start position on the lateral edge and the surface to be the inner surface of the pipe is φ). However, when one of angles of the three-stage fin is larger than an angle of a finpass roll in a vertical direction, a lateral edge of the strip is shaved by the fin, which may induce pads called "whisker," resulting in generation of a flaw during finpass forming, or causing spark in electric resistance welding. Therefore, the fin angle is preferably not more than the angle of the finpass roll in the vertical direction.

The tapering shaped on the right and left, two lateral edges of the strip 10 is made such that the slope angle α from the lateral edge of the strip 10 to the surface to be the outer surface of the pipe, and the slope angle γ from the lateral edge to the surface to be the inner surface of the pipe are 25° to 50° respectively, and the distance β in the thickness direction of the strip between the tapering start position on the lateral edge and the surface to be the outer surface of the pipe, and the distance φ in the vertical direction of the strip between the tapering start position and the surface to be the inner surface of the pipe are 20% to 40% of strip thickness respectively.

This is because when the slope angle α or γ is less than 25°, melting steel is insufficiently discharged from the central portion in thickness of the strip, and penetrators are defectively remained, resulting in reduction in toughness or strength after electric resistance welding is finished, and when the slope angle α or γ is more than 50 degrees, the tapering is still problematically remained as a flaw on a product pipe even after electric resistance welding is finished. Moreover, when the tapering start distance β or φ is less than 20% of thickness, melting steel is insufficiently discharged from the central portion in thickness, so that the penetrators tend to be remained, and when the tapering start distance β or φ is more than 40% of thickness, the tapering is still problematically remained as a flaw on a product pipe after electric resistance welding is finished.

As described above, the fin shape of the finpass forming end stand 3b is made to be the shape having three angles, and the fin shape is printed to the right and left, two lateral edges of the strip 10, therefore a shape of each lateral edge of the strip 10 can be shaped with appropriate tapering immediately before electric resistance welding is performed. As a result, the melting steel is sufficiently discharged during electric resistance welding, and the penetrators are securely removed, and consequently an electric resistance welding pipe having excellent characterization of welded seam can be obtained.

In still another example, as shown in FIG. 4A showing a cross section diagram and FIG. 4B showing a partial detail diagram thereof, a fin of the finpass forming first-stand 3a in a former stage has two-stage tapering (first-stage slope vertical-length δ and first-stage tapering angle γ), and such a shape is printed to right and left, two lateral edges of the strip 10, thereby as shown in FIG. 4C, right and left, two lateral edges at a side to be an inner surface side of a pipe are shaped with predetermined tapering (a slope angle from a lateral edge to a surface to be the inner surface of the pipe is γ, and a distance in a thickness direction between a start position on the lateral edge and the surface to be the inner surface of the pipe is φ). In addition, as shown in FIG. 4D showing a cross section diagram and FIG. 4E showing a partial detail diagram thereof, a fin of the finpass forming second-stand 3b in a latter stage has two-stage tapering (second-stage tapering angle is α and second-stage slope vertical-length is β), and such a shape is printed to right and left, two lateral edges of the strip 10, thereby as shown in FIG. 4F, right and left, two lateral edges at a side to be an outer surface side of the pipe are shaped with predetermined tapering (a slope angle from the lateral edge to a surface to be the outer surface of the pipe is α, and a distance in a thickness direction between a start position on the lateral edge and a surface to be the outer surface of the pipe is β).

When each lateral edge to be the inner surface of the pipe are shaped with the tapering by the finpass forming first-stand 3a, the shaped portion is significantly work-hardened by high pressure, therefore even if the lateral edge is further shaped with tapering by the finpass forming second-stand 3b, the tapering shaped by the first stand 3a is relatively not crushed. Therefore, the lateral edges of the strip can be shaped with the predetermined tapering in both the inner and outer surface sides of the pipe after finpass forming is finished.

The tapering shaped on the right and left, two lateral edges of the strip 10 is made such that the slope angle α from the lateral edge of the strip 10 to the surface to be the outer surface of the pipe, and the slope angle γ from the lateral edge to the surface to be the inner surface of the pipe are 25° to 50° respectively, and the distance β in a thickness direction of the strip between the tapering start position on the lateral edge and the surface to be the outer surface of the pipe, and the distance φ in a thickness direction of the strip between the tapering start position and the surface to be the inner surface of the pipe are 20% to 40% of strip thickness respectively.

This is because when the slope angle α or γ is less than 25°, melting steel is insufficiently discharged from the central portion in thickness of the strip, and penetrators are defectively remained, resulting in reduction in toughness or strength after electric resistance welding is finished, and when the slope angle α or γ is more than 50 degrees, the tapering is still problematically remained as a flaw on a product pipe even after electric resistance welding is finished. Moreover, when the tapering start distance β or φ is less than 20% of thickness, the melting steel is insufficiently discharged from the central portion in thickness, and the penetrators tend to be remained, and when the tapering start distance β or φ is more than 40% of thickness, the tapering is still problematically remained as a flaw on a product pipe after electric resistance welding is finished.

As described above, finpass is performed such that the fin shape of the first stand 3a in the former stage and the fin shape of the second stand 3b in the latter stage are made to be the shape having two angles respectively, and each of the fin shapes is printed to the right and left, two lateral edges of the strip 10, therefore a shape of the lateral edge of the strip 10 can be shaped with appropriate tapering immediately before electric resistance welding is performed. As a result, the melting steel is sufficiently discharged during electric resistance welding, and the penetrators are securely removed, and consequently an electric resistance welding pipe having excellent characterization of welded seam can be obtained.

In the first to third examples, the reason why the lateral edges at the pipe outer-surface side and/or the pipe inner-surface side of the strip are shaped with the tapering by the finpass forming end stand (second-stand 3b herein) is because since electric resistance welding is performed immediately after that, electric resistance welding can be performed while keeping excellent tapering. However, it is also acceptable that the lateral edges of the strip are shaped with tapering by a finpass forming start stand or finpass forming middle stand, but not shaped with tapering by the finpass forming end stand. Once the lateral edges of the strip are shaped with the tapering, the lateral edges are significantly work-hardened by high pressure, therefore even if the lateral edges are subjected to finpass forming thereafter, the tapering is relatively hardly crushed, and consequently a state where the lateral edges are shaped with the tapering can be kept even after finpass forming is finished.

Moreover, since only the finpass forming is used as means for shaping the tapering, equipment such as the edger roll or shaving roll is not necessary, therefore an exchange of a roll or a shaving stone for them is not necessary, and consequently an electric resistance welding pipe having excellent welding quality can be efficiently manufactured.

In this method of shaping the tapering in terms of finpass forming, it is sometimes difficult to improve toughness or strength of weld after electric resistance welding is finished.

With investigating the reason for this in detail, in a stage that a strip edge is heated before pressure welding (upset) in electric resistance welding, oxides, which are to be a cause of the penetrators as a welding defect, may be formed on the strip edge. The oxides float on a surface of melting steel, which is melted in a stage of melting each strip edge, and partially discharged along with the melting steel in a stage of pressure welding. At this time, if the strip edge is shaped with the tapering, the melting steel is easily discharged, in addition, the penetrator can be effectively discharged.

However, since the oxides on the strip edge being a source of the penetrators are increasingly generated with heating of electric resistance welding, the following case has sometimes occurred in some welding condition: toughness or strength after welding cannot be sufficiently improved only by shaping the tapering on the strip edge.

Thus, we observed the phenomenon of electric resistance welding in detail again, as a result, we noticed generation of the oxides being the cause of penetrators. That is, we investigated not only discharge of penetrators by shaping the tapering on the strip edge, but also a method of preventing generation of the oxides being the cause of the penetrators.

As a result, we understood that when non-oxidizing gas was blown to each strip edge under heating of electric resistance welding (that is, heating for melting edges to be pressure-welded before pressure welding), generation of the oxides was able to be suppressed. The non-oxidizing gas means non-active gas (nitrogen gas, helium gas, argon gas, neon gas, xenon gas and the like, or mixed gas formed by mixing at least two of them), deoxidation gas (hydrogen gas, carbon monoxide gas, methane gas, propane gas and the like, or mixed gas formed by mixing at least two of them), or mixed gas formed by mixing the non-active gas and the deoxidation gas.

That is, each strip edge is previously shaped with tapering before electric resistance welding is performed, thereby discharge of the penetrator is accelerated, in addition, the non-oxidizing gas is blown to the strip edge under heating during electric resistance welding, thereby generation of the oxides as a cause of the penetrators is suppressed. This can securely improve toughness or strength of weld compared with a prior-art level. However, when the non-oxidizing gas is simply blown, the effect of suppressing generation of the oxides on the strip edge is reduced more or less because peripheral air is sucked. Thus, the peripheral air is preferably prevented from being sucked. To this end, the strip edge under heating of electric resistance welding is preferably enclosed so that the inside of such enclosure is kept in a non-oxidizing gas atmosphere.

In those kinds of non-oxidizing gas, a gas containing the deoxidation gas is more preferably used, because the effect of suppressing generation of the oxides as a cause of the penetrators is further enhanced, and consequently toughness or strength of weld can be more significantly improved.

In the point of availability and cost reduction, the following gas is preferably used as the non-oxidizing gas:

In the case of single use of non-active gas: (A) either of nitrogen gas, helium gas, and argon gas, or mixed gas of at least two of them.

In the case of single use of deoxidation gas: (B) one of hydrogen gas and carbon monoxide gas, or mixed gas of the two.

In the case of using mixed gas of non-active gas and deoxidation gas: mixed gas of the above (A) and (B). It is obvious that particularly when a gas containing hydrogen gas and/or carbon monoxide gas is used, a thorough safety measure should be taken.

Moreover, to cope with the problem, we observed an electric resistance welding phenomenon in detail again and, as a result, noticed a confronting angle between two edges in a strip width direction (angle between vertical surfaces of two edges in a strip width direction) in electric resistance welding. That is, we found that the confronting angle between the vertical surfaces being not shaped with tapering is also much concerned with effective discharge of the penetrators along with the melting steel, in addition to shaping the tapering on each strip edge.

In electric resistance welding, when the confronting angle between the vertical surfaces of the edges of the strip (vertical edges of the strip) is changed, a discharge mode of the melting steel is varied. That is, when the confronting angle is set so as to be opened to a pipe outer-surface side, each strip edge shaped with the tapering is behaved such that a pipe inner-surface side is preferentially heated so that melting steel is first generated therein, and the melting steel is gradually pushed out to the pipe outer-surface side as each strip edge is increasingly confronted during electric resistance welding. When the confronting angle is set so as to be opened to the pipe inner-surface side, each strip edge shaped with the tapering is behaved such that the pipe outer-surface side is preferentially heated so that melting steel is first generated therein, and the melting steel is gradually pushed out to the pipe inner-surface side as each strip edge is increasingly confronted during electric resistance welding.

At this time, for example, when it is assumed that the confronting angle to be opened to the pipe outer-surface side is positive, and the confronting angle to be opened to the pipe inner-surface side is negative, if the confronting angle is large, more than $+1°$ or less than $-1°$, since a strip edge at one side is preferentially melted and thus the amount of melting steel to be flowed to a strip edge at an opposite side is significantly increased, the melting steel cannot be sufficiently discharged within a welding period before confronting is completed, consequently electric resistance welding is completed while the melting steel is still confined within the strip. As a result, penetrators, which aggregate into the melting steel or onto a surface thereof, are left within the strip, resulting in significant reduction in toughness or strength of electric resistance weld. From the above, the confronting angle of the vertical surfaces between the edges of the strip in electric resistance welding needs to be within $±1°$ ($-1°$ to $+1°$).

At that time, when each strip edge is previously shaped with tapering, the melting amount of one edge that is first melted is decreased by amount corresponding to such decreased volume, and the edge is melted along the tapering, so that melting steel is further decreased, therefore the penetrators can be sufficiently discharged from the electric resistance weld by both effects of the confronting angle and the tapering, leading to significant improvement in toughness and strength.

An example as above is described below.

FIG. 1 is a diagram showing a manufacturing line of an electric resistance welding pipe used in an example. The manufacturing line of the electric resistance welding pipe has a basic configuration where a sheet (strip) 10 is uncoiled from an uncoiler 1; then the strip is reformed to be flat by a leveler 2; then the strip 10 is gradually rounded by a roll forming machine 4; then right and left, two lateral edges of a strip 20 that was rounded into a pipe shape are welded by electric resistance welding using an electric resistance welder including an induction heating section 5 and a squeeze roll (electric resistance welding section) 6 so that the strip is formed into a pipe 30; then a weld bead portion of the pipe 30 is cut by a bead cutter 7; then the pipe 30 after cutting is adjusted in outer diameter by a sizer 8; and then the pipe 30 is cut out into a predetermined length by a pipe cutter 9.

The roll forming machine 4 has a finpass forming stand 3 including a plurality of stands (for example, three stands) in a last stage, and as described before, a fin of each stand is formed into an appropriate shape, thereby a top side of each strip edge (inner surface side of the pipe) and/or a bottom side of each strip edge (outer surface side of the pipe) can be shaped with predetermined tapering.

For example, as shown in FIG. 2A showing a cross section diagram and FIG. 2B showing a partial detail diagram thereof, an optional stand of the finpass forming stand 3 has a fin shape of predetermined two-stage tapering (second-stage tapering angle is $\alpha$, and second-stage slope vertical-length is $\beta$). Such a fin shape is printed to lateral edges of the strip 10, thereby right and left, two lateral edges at the bottom side of the strip 10 (outer surface side of the pipe) are shaped with the tapering having a tapering angle of $\alpha$ and a tapering height of $\beta$.

Figure 9:
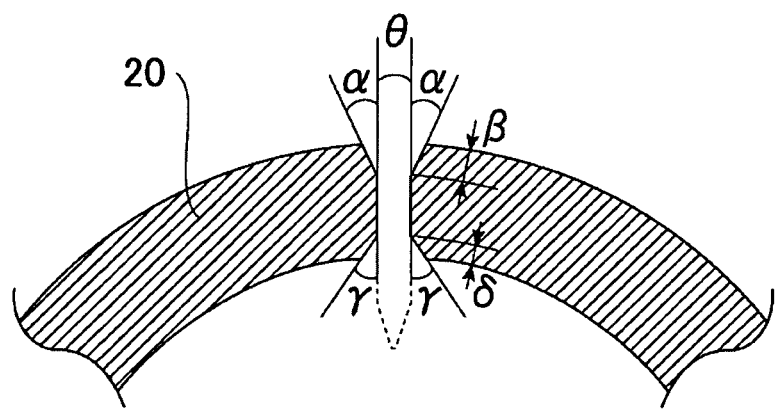
FIG. 9 is a diagram showing a strip, which was shaped with tapering, in a confronting condition immediately before electric resistance welding is performed.

In the above way, the pipe-shaped strip 20, which is shaped with the tapering having a tapering angle of $\alpha$ and a tapering height of $\beta$ at the outer surface side, and shaped with the tapering having a tapering angle of $\gamma$ and a tapering height of $\delta$ at the inner surface side, is set such that a confronting angle $\theta$ between vertical surfaces of the edges of the strip is from $-1°$ to $+1°$ for electric resistance welding as shown in FIG. 9.

Thus, the penetrators can be sufficiently discharged from the electric resistance weld, consequently an electric resistance welding pipe having highly excellent toughness and strength can be obtained.

Moreover, to cope with the problem, we observed an electric resistance welding phenomenon in detail again and, as a result, noticed an apex angle in V-shape (vee angle) formed in a longitudinal direction by two edges in a strip width direction immediately before electric resistance welding was performed. That is, we found that the vee angle is also much concerned with effective discharge of penetrators along with the melting steel, in addition to shaping the tapering on each strip edge.

In electric resistance welding, when the vee angle shaped by each strip edge is changed, a generation/discharge mode of the melting steel is varied. That is, when the vee angle is smaller, the strip edge is started to be heated at a point distant from weld, and as a heating point approaches the weld, the strip edge is gradually increased in temperature, and heating is gradually spread from upper and lower parts in thickness to a central portion in thickness of the strip edge. While melting steel is gradually generated with progress of the phenomena, solidification starts before melting steel generated in the upper part in thickness (pipe outer-surface side) and the lower part in thickness (pipe inner-surface side) of the strip edge arrives at the weld, therefore melting steel in the central portion in thickness is hard to be discharged to the outside. As a result, penetrators generated with the molten steel also tend to be remained within the strip, leading to significant reduction in toughness or strength of electric resistance weld.

Thus, we investigated the vee angle and, as a result, understood that if the vee angle is 2° or more, the melting steel is excellently discharged, leading to improvement in toughness or strength of weld.

However, if the vee angle is excessively increased, weld is insufficiently heated and thereby temperature of the strip edge is hardly increased, consequently a state where each edge is wholly covered with oxide films, called weld oxides, occurs rather than generation of melting steel, leading to significant reduction in toughness or strength of the weld. To cope with this, we understood that if the vee angle was 8° or less, the weld oxides were able to be prevented.

At that time, when each strip edge is previously shaped with tapering, the melting amount of one edge that is first melted is decreased by amount corresponding to such decreased volume, and melting proceeds along the tapering, so that melting steel is further decreased, therefore the penetrators can be sufficiently discharged from the electric resistance weld by both effects of the vee angle and the tapering, leading to significant improvement in toughness and strength.

An example as above is described below.

FIG. 1 is a diagram showing a manufacturing line of an electric resistance welding pipe. The manufacturing line of the electric resistance welding pipe has a basic configuration where a sheet (strip) 10 is uncoiled from an uncoiler 1; then the strip is reformed to be flat by a leveler 2; then the strip 10 is gradually rounded by a roll forming machine 4; then right and left, two lateral edges of a strip 20 that was rounded into a pipe shape are welded by electric resistance welding using an electric resistance welder including an induction heating section 5 and a squeeze roll (electric resistance welding section) 6 so that the strip is formed into a pipe 30; then a weld bead portion of the pipe 30 is cut by a bead cutter 7; then the pipe 30 after cutting is adjusted in outer diameter by a sizer 8; and then the pipe 30 is cut out into a predetermined length by a pipe cutter 9.

The roll forming machine 4 has a finpass forming stand 3 including a plurality of stands (for example, three stands) in a last stage, and as described before, a fin of each stand is formed into an appropriate shape, thereby a top side of each strip edge (inner surface side of the pipe) and/or a bottom side of each strip edge (outer surface side of the pipe) can be shaped with predetermined tapering.

For example, as shown in FIG. 2A showing a cross section diagram and FIG. 2B showing a partial detail diagram thereof, an optional stand of the finpass forming stand 3 has a fin shape of predetermined two-stage tapering (second-stage tapering angle is $\alpha$, and second-stage slope vertical-length is $\beta$). Such a fin shape is printed to lateral edges of the strip 10, thereby, right and left, two lateral edges at the bottom side of the strip 10 (outer surface side of the pipe) are shaped with the tapering having a tapering angle of $\alpha$ and a tapering height of $\beta$.

Figure 11:
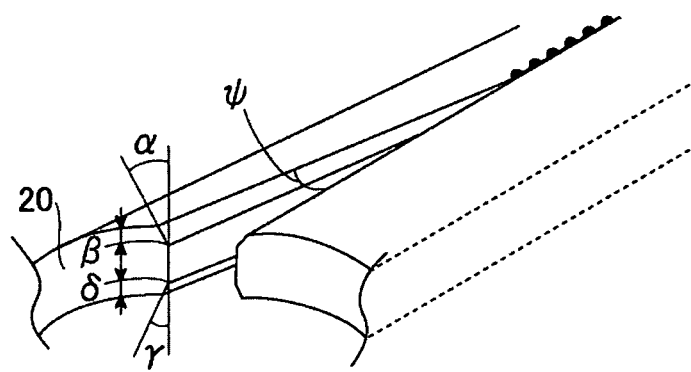
FIG. 11 is a diagram showing a vee angle of a strip being shaped with tapering immediately before electric resistance welding is performed.

In the above way, the pipe-shaped strip 20, which is shaped with the tapering having a tapering angle of $\alpha$ and a tapering height of $\beta$ at the outer surface side, and shaped with the tapering having a tapering angle of $\gamma$ and a tapering height of $\delta$ at the inner surface side, is set such that a vee angle $\phi$ is 2° to 8° for electric resistance welding as shown in FIG. 11.

Thus, the penetrators can be sufficiently discharged from the electric resistance weld, consequently an electric resistance welding pipe having highly excellent toughness and strength can be obtained.

EXAMPLES

Example 1

Hereinafter, example 1 is described.

A strip (steel strip) 1920 mm in width and 19.1 mm in thickness was used to manufacture electric resistance welding pipes 600 mm in diameter. Test pieces were cut out from the weld of the manufactured electric resistance welding pipe, and subjected to Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and Charpy impact values and brittle fracture surface ratios were measured. A Charpy impact value of 125 J or more, and a brittle fracture surface ratio of 35% or less were specified as a performance allowable range respectively.

Example 11

As example 11, the electric resistance welding pipe was manufactured. That is, lateral edges of a strip at a side to be a pipe outer-surface side were shaped with tapering by a finpass forming end stand of which the fin has two angles (first angle of the fin is 85° with respect to a perpendicular to a roll axis). The slope angle α of the tapering was made to be 30° to a vertical edge of the strip.

Example 12

As example 12, the electric resistance welding pipe was manufactured. That is, in two-stand finpass forming, lateral edges of a strip at a side to be a pipe outer-surface side, and lateral edges of the strip at a side to be a pipe inner-surface side were shaped with the tapering by a first stand of which the fin has three angles (second angle of the fin is 40° with respect to a perpendicular to a roll axis), respectively. Either of the slope angle α at the side to be the pipe outer-surface side and the slope angle γ at the side to be the pipe inner-surface side was made to be 25°.

Example 13

As example 13, the electric resistance welding pipe was manufactured. That is, in three-stand finpass forming, lateral edges of a strip at a side to be a pipe inner-surface side were shaped with tapering by a first stand of which the fin has two angles (first angle of the fin is 60° with respect to a perpendicular to a roll axis), and lateral edges of the strip at a side to be a pipe outer-surface side were shaped with tapering by a third stand of which the fin has two angles (first angle of the fin is 85° with respect to a perpendicular to a roll axis). The slope angle α at the side to be the pipe outer-surface side was made to be 30°, and the slope angle γ at the side to be the pipe inner-surface side was made to be 40°.

Prior Art Example 1

As prior art example 1, the electric resistance welding pipe was manufactured according to the method described in JP-A-57-031485. That is, in a finpass forming first-stand of which the fin has one angle, it was attempted that the upset amount of finpass was adjusted so that lateral edges of a strip were contacted to the fin over an edge portion corresponding to approximate half the thickness, thereby lateral edges at a side to be a pipe inner-surface side were shaped with tapering, and in a finpass forming second-stand of which the fin has one angle, it was aimed that lateral edges of the strip were intended to be contacted to the fin over the remained edge portion corresponding to approximate half the thickness so that lateral edges at a side to be a pipe outer-surface side were shaped with tapering. The slope angle of the tapering was made to be 20°.

Prior Art Example 2

As prior art example 2, the electric resistance welding pipe was manufactured according to the method described in JP-A-63-317212. That is, it was attempted that an edger roll was arranged at an upstream side of finpass forming, and the edger roll was used to reduce lateral edges of a strip, thereby the lateral edges of the strip were wholly shaped with tapering, and in a finpass forming stand of which the fin has one angle, it was aimed that lateral edges of the strip were intended to be contacted to the fin over an edge portion corresponding to approximate half the thickness so that lateral edges at a side to be a pipe outer-surface side were shaped into vertical surfaces. The slope angle of the tapering was made to be 20°.

Prior Art Example 3

As prior art example 3, in the manufacturing line shown in FIG. 1, lateral edges of a strip were previously polished into a rectangular shape, and a finpass forming stand of which the fin has one angle was used to manufacture the electric resistance welding pipe.

Measurements were made on Charpy impact values and brittle fracture surface ratios of the weld of the electric resistance welding pipes manufactured according to the above, and results of the measurements are shown in Table 1. Moreover, lateral edges of the strips were cut and sampled immediately before electric resistance welding was performed, and shapes of the lateral edges were observed, and results of such observation are also described.

TABLE 1

|  | Target value of tapering in finpass forming | Measured value of tapering immediately before electric resistance welding | Charpy impact value | Brittle fracture surface ratio |
|---|---|---|---|---|
| Example 1 | 30° at pipe outer-surface side | 30° at pipe outer-surface side | 150 J | 25% |
| Example 2 | 25° at pipe outer-surface side 25° at pipe inner-surface side | 25° at pipe outer-surface side 25° at pipe inner-surface side | 180 J | 15% |

TABLE 1-continued

|  | Target value of tapering in finpass forming | Measured value of tapering immediately before electric resistance welding | Charpy impact value | Brittle fracture surface ratio |
|---|---|---|---|---|
| Example 3 | 30° at pipe outer-surface side 40° at pipe inner-surface side | 30° at pipe outer-surface side 40° at pipe inner-surface side | 200 J | 10% |
| Prior art example 1 | 25° at pipe outer-surface side 25° at pipe inner-surface side | No tapering (smoothed) | 25 J | 51% |
| Prior art example 2 | 20° at pipe inner-surface side | No tapering (smoothed) | 25 J | 50% |
| Prior art example 3 | Not set | Not set | 20 J | 58% |

From Table 1, in the examples 11 to 13, the weld has high impact strength and a small brittle fracture surface ratio, that is, toughness is excellent, and reliability of products is high. In contrast, in the prior art examples 1 to 3, the weld has low impact strength and a large brittle fracture surface ratio, that is, toughness is reduced, and reliability of products is low. Moreover, when the shapes of the lateral edges of the strips are compared to each other immediately before electric resistance welding is performed after finpass forming, while the desired tapering is kept on both the lateral edges at the side to be the pipe inner-surface side, and the lateral edges at the side to be the pipe outer-surface side in the examples 11 to 13, the lateral edges were smoothed during finpass forming, and the tapering was not kept in both of the prior examples 1 and 2.

Consequently, it was confirmed that an electric resistance welding pipe having excellent characterization of welded seam was able to be manufactured.

Example 2

Hereinafter, example 2 is described. In example 2, a strip formed by a steel strip 1920 mm in width and 19.1 mm in thickness was passed through a pipe mill as shown in FIG. 1, that is, a pipe mill including an uncoiler 1, a leveler 2, a roll forming machine 4 (including finpass forming having a plurality of stands (finpass roll stand) 3), an electric resistance welder (including a contact tip 50 and squeeze roll 6), bead cutting means 7, a sizer 8, and a pipe cutter 9 so that a steel pipe 60 mm in outer diameter was manufactured. In this pipe manufacturing, manufacturing conditions were varied as the following four conditions.

Example 21

Figure 7:
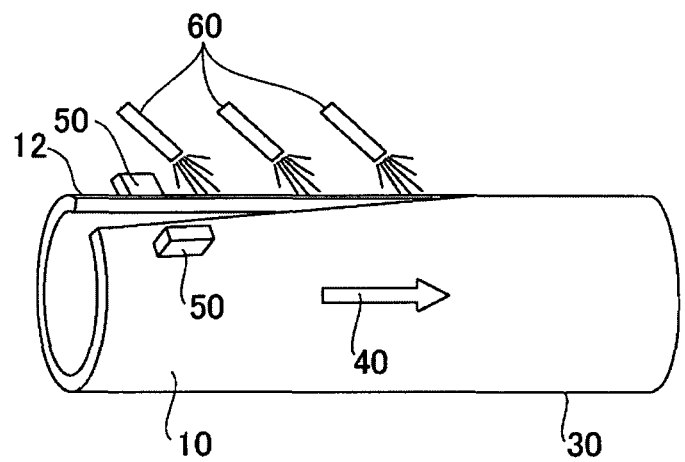
FIG. 7 is a schematic diagram showing an example where non-oxidizing gas is blown to edges of a strip under heating of electric resistance welding.

A pipe outer-diameter side of each strip edge was shaped with approximately straight tapering (tapering angle α and tapering depth β were set as values as shown in Table 2) by a third stand of finpass forming 3 having three stands in all, and as shown in FIG. 7, argon gas was blown from gas supply nozzles 60 to edges of a strip 10 under heating of electric resistance welding (resistance heating from a contact tip 50). In FIG. 7, 40 shows an advance direction of the strip 10 (formed into a pipe 30 after welding), and the squeeze roll is omitted to be shown.

Example 22

Figure 8:
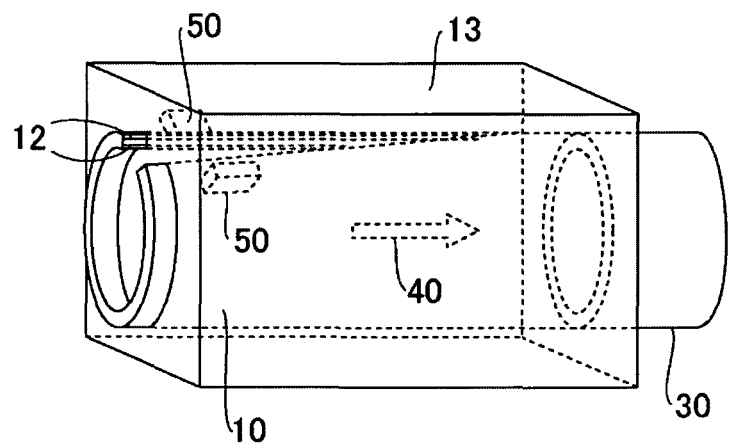
FIG. 8 is a schematic diagram showing an example where the periphery of edges of a strip under heating of electric resistance welding is kept in a non-oxidizing gas atmosphere.

A pipe inner-diameter side of each strip edge was shaped with approximately straight tapering (tapering angle α and tapering depth β were set in values as shown in Table 2) by a first stand of finpass forming 3 having two stands in all, and a pipe outer-diameter side of the edge was shaped with the approximately straight tapering by a second stand of the finpass forming respectively, and as shown in FIG. 8, edges of a strip 10, which were under heating of electric resistance welding (resistance heating from a contact tip 50) while being passed in an advance direction 40, were enclosed by a gas atmosphere box 13, and the inside of the box was kept in an atmosphere of 1% carbon dioxide gas and nitrogen gas as the remainder. In FIG. 8, 40 shows the advance direction of the strip 10 (formed into a pipe 30 after welding), and the squeeze roll is omitted to be shown.

Comparative Example 21

Each strip edge was shaped with approximately straight tapering (tapering angle α and tapering depth β were set as values as shown in Table 2) at both inner and outer diameter sides of a pipe by a first stand of finpass forming 3 having three stands in all, and each strip edge under heating of electric resistance welding was left to be exposed to the air.

Prior Art Example 21

A shape of each strip edge was kept to be an approximate rectangular shape (longitudinal edge shape of a rectangle), and each strip edge under heating of electric resistance welding was left to be exposed to the air.

Test pieces were cut out from the weld of the steel pipes manufactured at the above four conditions, and subjected to Charpy test to evaluate performance of the pipes. As Charpy test pieces, JIS5 2 mm-V-notch impact test pieces were used, which were sampled by one for each of ten different points in a pipe length direction in a manner that a longitudinal direction of the test piece is taken in a pipe circumferential direction, and a longitudinal center of a notch is taken at a central position in thickness of the weld, and an impact test was performed at a test piece temperature of −46° C., and Charpy impact values and brittle fracture surface ratios were measured. A Charpy impact value of 125 J or more, and a brittle fracture surface ratio of 35% or less were specified as a performance allowable range respectively. Results of the measurement are shown in Table 2.

From Table 2, in the examples 21 and 22, the weld has significantly high impact strength (Charpy impact values) and a small brittle fracture surface ratio, that is, toughness is excellent, and reliability of products is high. In contrast, in the comparative example 21 and the prior art examples 21, the weld has low impact strength (Charpy impact values) and a large brittle fracture surface ratio, that is, toughness is reduced, and reliability of products is low.

TABLE 2

| | Atmosphere of electric resistance welding | Method of shaping tapering | Edge tapering immediately before welding | Charpy impact value | Brittle fracture surface ratio |
|---|---|---|---|---|---|
| Example 21 | Argon gas is blown | Third stand of 3-stand finpass forming 3 | $\alpha = 25°$<br>$\beta = 4$ mm<br>(21% of thickness) | 250 J | 12% |
| Example 22 | 1% carbon dioxide gas and nitrogen gas as the remainder | First stand and second stand of finpass forming having 2 stands in all | $\alpha = 45°$<br>$\beta = 7$ mm<br>(37% of thickness) | 310 J | 7% |
| Comparative example 21 | air | First stand of 3-stand finpass forming 3 | $\alpha = 20°$<br>$\beta = 4$ mm<br>(16% of thickness) | 130 J | 33% |
| Prior art example 21 | air | Not shaped | No tapering | 25 J | 55% |

Example 3

Hereinafter, example 3 is described.

Here, a strip (steel strip) 1920 mm in width and 19.1 mm in thickness was used to manufacture electric resistance welding pipes 600 mm in diameter.

Test pieces were cut out from the weld of the manufactured electric resistance welding pipes, and subjected to Charpy test to evaluate performance of the pipes. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and Charpy impact values and brittle fracture surface ratios were measured. A Charpy impact value of 125 J or more, and a brittle fracture surface ratio of 35% or less were specified as a performance allowable range respectively.

Example 31

As example 31, the electric resistance welding pipe was manufactured. At that time, electric resistance welding was performed in a manner that a top side of a strip 10 (inner surface side of a pipe 20) was shaped with approximately straight tapering having a tapering angle $\gamma$ of 25° and a tapering height $\delta$ of 4 mm (21% of thickness) by a third stand of a finpass forming stand including three stands, and roll forming was adjusted such that a confronting angle $\theta$ between vertical edges of the strip was opened by 0.3° to a pipe outer-surface side immediately before the electric resistance welding was performed.

Example 32

As example 32, electric resistance welding was performed in a manner that a top side of a strip 10 (inner surface side of a pipe 20) was shaped with approximately straight tapering having a tapering angle $\gamma$ of 45° and a tapering height $\delta$ of 7 mm (37% of thickness) by a first stand of a finpass forming stand including two stands, and a bottom side of the strip 10 (outer surface side of the pipe 20) was shaped with approximately straight tapering having a tapering angle $\alpha$ of 45° and a tapering height $\beta$ of 7 mm (37% of thickness) by a second stand of the finpass forming stand, and roll forming was adjusted such that a confronting angle $\theta$ between vertical edges of the strip was opened by 0.2° to a pipe inner-surface side immediately before the electric resistance welding was performed.

Comparative Example 31

As comparative example 31, electric resistance welding was performed in a manner that a bottom side of a strip 10 (outer surface side of a pipe 20) was shaped with approximately straight tapering having a tapering angle $\alpha$ of 20° and a tapering height $\beta$ of 3 mm (16% of thickness) by a first stand of finpass forming including three stands, and a top side of the strip 10 (inner surface side of the pipe 20) was shaped with approximately straight tapering having a tapering angle $\gamma$ of 20° and a tapering height $\delta$ of 3 mm (16% of thickness) by the first stand, and roll forming was adjusted such that a confronting angle $\theta$ between vertical edges of the strip was opened by 1.1° to a pipe outer-surface side immediately before the electric resistance welding was performed.

Prior Art Example 31

Figure 10:
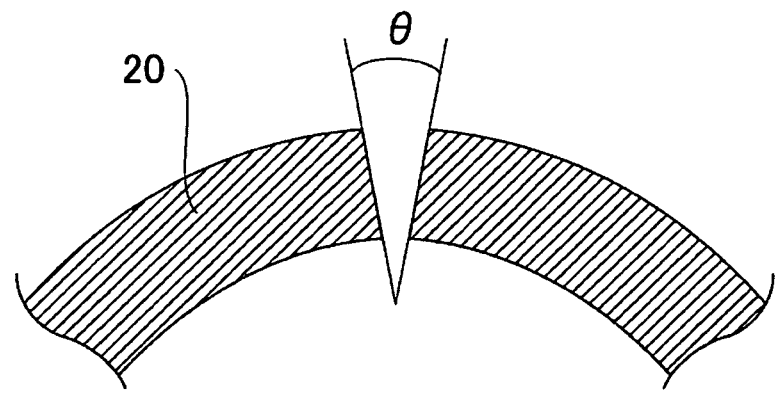
FIG. 10 is a diagram showing a prior-art strip having rectangular edges in a confronting condition immediately before electric resistance welding is performed.

As prior art example 31, electric resistance welding was performed in a manner that each strip edge was in an approximately rectangular shape, and a confronting angle $\theta$ between vertical edges of the strip was opened by 1.1° to a pipe outer-surface side immediately before the electric resistance welding was performed as shown in FIG. 10.

Measurements were made on Charpy impact values and brittle fracture surface ratios of the weld of the electric resistance welding pipes manufactured according to the above, and results of the measurements are shown in Table 3.

TABLE 3

|  | Method of shaping tapering | Tapering immediately before electric resistance welding | Confronting angle between vertical edges of strip | Charpy impact value | Brittle fracture surface ratio |
|---|---|---|---|---|---|
| Example 31 | Third stand of 3-stand finpass forming | Tapering angle: 25° Tapering height: 4 mm (21% of thickness) | 0.3° to pipe outer-surface side | 250 J | 12% |
| Example 32 | First stand and second stand of 2-stand finpass forming | Tapering angle: 45° Tapering height: 7 mm (37% of thickness) | 0.2° to pipe inner-surface side | 310 J | 8% |
| Comparative example 31 | First stand of 3-stand finpass forming | Tapering angle: 20° Tapering height: 3 mm (16% of thickness) | 1.1° to pipe outer-surface side | 130 J | 33% |
| Prior art example 31 | Not shaped | No tapering | 1.1° to pipe outer-surface side | 25 J | 55% |

From Table 3, in the electric resistance welding pipes according to the examples 31 and 32, the weld has high impact strength and a small brittle fracture surface ratio, that is, toughness is excellent, and reliability of products is high. In contrast, in the electric resistance welding pipes according to the comparative example 31 and the prior art example 31, the weld has low impact strength and a large brittle fracture surface ratio, that is, toughness is reduced, and reliability of products is low.

Thus, it was confirmed that an electric resistance welding pipe having excellent characterization of welded seam was able to be manufactured.

Example 4

Hereinafter, description is made according to an example.

A strip (steel strip) 1920 mm in width and 19.1 mm in thickness was used to manufacture electric resistance welding pipes 600 mm in diameter.

Test pieces were cut out from the weld of the manufactured electric resistance welding pipes, and subjected to Charpy test to evaluate performance of the pipe. Charpy test pieces were sampled by one for each of ten different points in a pipe length direction in a manner that a longitudinal direction of the test piece was parallel to a pipe circumferential direction, and a longitudinal center of a notch corresponded to a central position in thickness of the weld. The test pieces were formed as JIS5 2 mm-V-notch impact test pieces, and subjected to an impact test at −46° C., and Charpy impact values and brittle fracture surface ratios were measured. A Charpy impact value of 125 J or more, and a brittle fracture surface ratio of 35% or less were specified as a performance allowable range respectively.

Example 41

As example 41, the electric resistance welding pipe was manufactured. At that time, electric resistance welding was performed in a manner that a bottom side of a strip 10 (outer surface side of a pipe 20) was shaped with approximately straight tapering having a tapering angle α of 25° and a tapering height β of 4 mm (21% of thickness) by a third stand of a finpass forming stand including three stands, and roll forming was adjusted such that a vee angle φ formed by edges of a strip was 2.5° immediately before the electric resistance welding was performed.

Example 42

As example 42, electric resistance welding was performed in a manner that a top side of a strip 10 (inner surface side of a pipe 20) was shaped with approximately straight tapering having a tapering angle γ of 45° and a tapering height δ of 7 mm (37% of thickness) by a first stand of a finpass forming stand including two stands, and a bottom side of the strip 10 (outer surface side of the pipe 20) was shaped with approximately straight tapering having a tapering angle α of 45° and a tapering height β of 7 mm (37% of thickness) by a second stand of the finpass forming stand, and roll forming was adjusted such that a vee angle φ formed by edges of a strip was 7.5° immediately before the electric resistance welding was performed.

Comparative Example 41

As comparative example 41, electric resistance welding was performed in a manner that a bottom side of a strip 10 (outer surface side of a pipe 20) was shaped with approximately straight tapering having a tapering angle α of 20° and a tapering height β of 3 mm (16% of thickness) by a first stand of finpass forming including three stands, and a top side of the strip 10 (inner surface side of the pipe 20) was shaped with approximately straight tapering having a tapering angle γ of 20° and a tapering height δ of 3 mm (16% of thickness) by the first stand, and roll forming was adjusted such that a vee angle φ formed by edges of a strip was 1.5° immediately before the electric resistance welding was performed.

Prior Art Example 41

Figure 12:
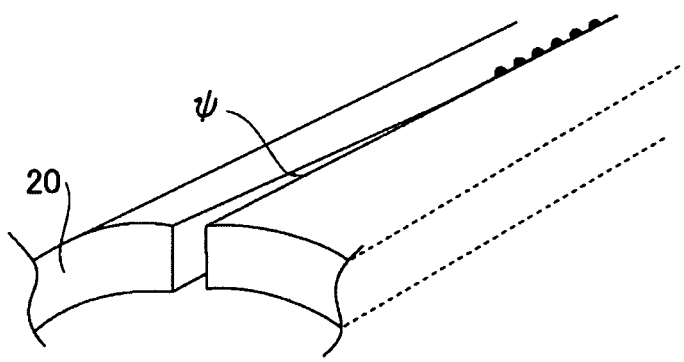
FIG. 12 is a diagram showing a vee angle of a prior-art strip having rectangular edges immediately before electric resistance welding is performed.

As prior art example 41, electric resistance welding was performed in a manner that each strip edge was in an approximately rectangular shape, and roll forming was adjusted such that a vee angle φ formed by edges of a strip was 1.8° immediately before the electric resistance welding as shown in FIG. 12 was performed.

Measurements were made on Charpy impact values and brittle fracture surface ratios of the weld of the electric resistance welding pipes manufactured according to the above, and results of the measurements are shown in Table 4.

TABLE 4

|  | Method of shaping tapering | Tapering immediately before electric resistance welding | vee angle | Charpy impact value | Brittle fracture surface ratio |
|---|---|---|---|---|---|
| Example 41 | Third stand of 3-stand finpass forming | Tapering angle: 25° Tapering height: 4 mm (21% of thickness) | 2.5° | 250 J | 12% |
| Example 42 | First stand and second stand of 2-stand finpass forming | Tapering angle: 45° Tapering height: 7 mm (37% of thickness) | 7.5° | 310 J | 8% |
| Comparative example 41 | First stand of 3-stand finpass forming | Tapering angle: 20° Tapering height: 3 mm (16% of thickness) | 1.5° | 130 J | 33% |
| Prior art example 41 | Not shaped | No tapering | 1.8° | 25 J | 55% |

From Table 4, in the electric resistance welding pipes according to the examples 41 and 42, the weld has high impact strength and a small brittle fracture surface ratio, that is, toughness is excellent, and reliability of products is high. In contrast, in the electric resistance welding pipes according to the comparative example 41 and the prior art example 41, the weld has low impact strength and a large brittle fracture surface ratio, that is, toughness is reduced, and reliability of products is low.

Thus, it was confirmed that an electric resistance welding pipe having excellent characterization of welded seam was able to be manufactured.

The invention claimed is:

1. A method of manufacturing an electric resistance welding pipe having excellent characterization of welded seam, comprising:
   subjecting a strip to forming such that longitudinally extending edges substantially face each other;
   shaping by tapering the longitudinally extending edges at either of top and bottom sides of the strip, or the longitudinally extending edges at both of the top and bottom sides of the strip, wherein an angle from a surface of the longitudinally extending edge toward vertical direction is in a range of 25 degrees to 50 degrees and a length of a perpendicular from starting position to end position shaped by the tapering at one side is 20% to 45% of thickness and wherein edges at an inner surface side of the strip are shaped with tapering in a first stage of finpass tapering and edges at an outer surface side of the strip are shaped with tapering in a second stage of finpass tapering; and
   welding the longitudinally extending edges by electric resistance welding to form a pipe.

2. A method of manufacturing an electric resistance welding pipe having excellent characterization of welded seam, comprising:
   in finpass forming of a roll forming process,
   printing a shape to the longitudinally extending edges of a strip to shape tapering on the longitudinally extending edges with a fin shape having two or more angles, wherein an angle from a surface of the longitudinally extending edge toward vertical direction is in a range of 25 degrees to 50 degrees and a length of a perpendicular from starting position to end position shaped by the tapering at one side is 20% to 45% of thickness and wherein edges at an inner surface side of the strip are shaped with tapering in a first stage of finpass tapering and edges at an outer surface side of the strip are shaped with tapering in a second stage of finpass tapering.

3. The method according to claim 1 or 2, wherein:
   edges at one side in a thickness direction of the strip are round-shaped.

4. The method according to claim 1 or 2, wherein:
   the edges are shaped with the tapering in finpass forming including at least a finpass end stand.

5. The method according to claim 1 or 2, further comprising:
   blowing non-active gas or deoxidation gas on to the formed strip during electric resistance welding.

6. The method according to claim 1 or 2, wherein:
   electric resistance welding is performed with a confronting angle between edges of a sheet being from −1 degree to +1 degree.

7. The method according to claim 1 or 2, wherein:
   electric resistance welding is performed with a vee angle shaped by strip edge being from 2 degrees to 8 degrees.

* * * * *